(12) United States Patent
Preston

(10) Patent No.: US 10,648,089 B2
(45) Date of Patent: May 12, 2020

(54) HYDROGEN SYSTEM AND METHOD OF OPERATION

(71) Applicant: Skyre, Inc., East Hartford, CT (US)

(72) Inventor: Joshua S. Preston, East Hartford, CT (US)

(73) Assignee: SKYRE, INC., East Hartford, CT (US)

(*) Notice: Subject to any disclaimer, the term of this patent is extended or adjusted under 35 U.S.C. 154(b) by 129 days.

(21) Appl. No.: 16/070,075

(22) PCT Filed: Jan. 17, 2017

(86) PCT No.: PCT/US2017/013823
§ 371 (c)(1),
(2) Date: Jul. 13, 2018

(87) PCT Pub. No.: WO2017/124112
PCT Pub. Date: Jul. 20, 2017

(65) Prior Publication Data
US 2019/0024247 A1 Jan. 24, 2019

Related U.S. Application Data

(60) Provisional application No. 62/279,322, filed on Jan. 15, 2016.

(51) Int. Cl.
*C25B 1/04* (2006.01)
*C25B 9/08* (2006.01)
(Continued)

(52) U.S. Cl.
CPC .............. *C25B 1/04* (2013.01); *B01D 53/326* (2013.01); *C25B 1/10* (2013.01); *C25B 9/08* (2013.01);
(Continued)

(58) Field of Classification Search
CPC .......................... B01D 53/326; C25B 1/02–12
See application file for complete search history.

(56) References Cited

U.S. PATENT DOCUMENTS 5,635,039 A 6/1997 Cisar et al.
2004/0040862 A1 3/2004 Kosek et al.
(Continued)

FOREIGN PATENT DOCUMENTS

WO 2015002953 A1 1/2015
WO 2016038214 A1 3/2016

OTHER PUBLICATIONS

International Search Report and Written Opinion for International Application No. PCT/US2017/013823 dated Jun. 2, 2017; 12 pgs.

*Primary Examiner* — Nicholas A Smith
(74) *Attorney, Agent, or Firm* — Cantor Colburn LLP

(57) ABSTRACT

A system for providing hydrogen includes a first electrochemical cell or stack including a first cathode and a first anode separated by a first proton exchange membrane. A first inlet is in communication with the anode side of the first electrochemical cell or stack. The first inlet receives a first gas including hydrogen. A liquid composition on a liquid flow path is in communication with the cathode side of the first electrochemical cell or stack. The liquid composition includes water and a water-compatible redox compound. A second electrochemical cell stack including a second cathode and a second anode separated by a second proton exchange membrane is disposed with the anode side of the second electrochemical cell or stack in communication with the liquid flow path. A hydrogen outlet in communication with the cathode side of the second electrochemical cell or stack dispenses hydrogen from the system.

14 Claims, 1 Drawing Sheet

(51) Int. Cl.
| | |
|---|---|
| *H01M 8/18* | (2006.01) |
| *H01M 8/04029* | (2016.01) |
| *H01M 8/0656* | (2016.01) |
| *C25B 1/10* | (2006.01) |
| *B01D 53/32* | (2006.01) |
| *C25B 9/18* | (2006.01) |
| *H01M 8/249* | (2016.01) |
| *C25B 13/08* | (2006.01) |
| *C25B 15/02* | (2006.01) |
| *C25B 15/08* | (2006.01) |
| *H01M 8/1018* | (2016.01) |

(52) U.S. Cl.
CPC ............... *C25B 9/18* (2013.01); *C25B 13/08* (2013.01); *C25B 15/02* (2013.01); *C25B 15/08* (2013.01); *H01M 8/04029* (2013.01); *H01M 8/0656* (2013.01); *H01M 8/184* (2013.01); *H01M 8/249* (2013.01); *B01D 2256/16* (2013.01); *B01D 2256/18* (2013.01); *B01D 2257/108* (2013.01); *B01D 2257/11* (2013.01); *H01M 2008/1095* (2013.01); *Y02E 60/366* (2013.01)

(56) References Cited

U.S. PATENT DOCUMENTS

| | | |
|---|---|---|
| 2004/0131902 A1 | 7/2004 | Frank et al. |
| 2004/0214081 A1 | 10/2004 | Nobuta et al. |
| 2009/0277800 A1 | 11/2009 | Grimes et al. |
| 2013/0071763 A1 | 3/2013 | Betts |
| 2014/0318979 A1 | 10/2014 | Cronin et al. |
| 2014/0353169 A1 | 12/2014 | Preston |

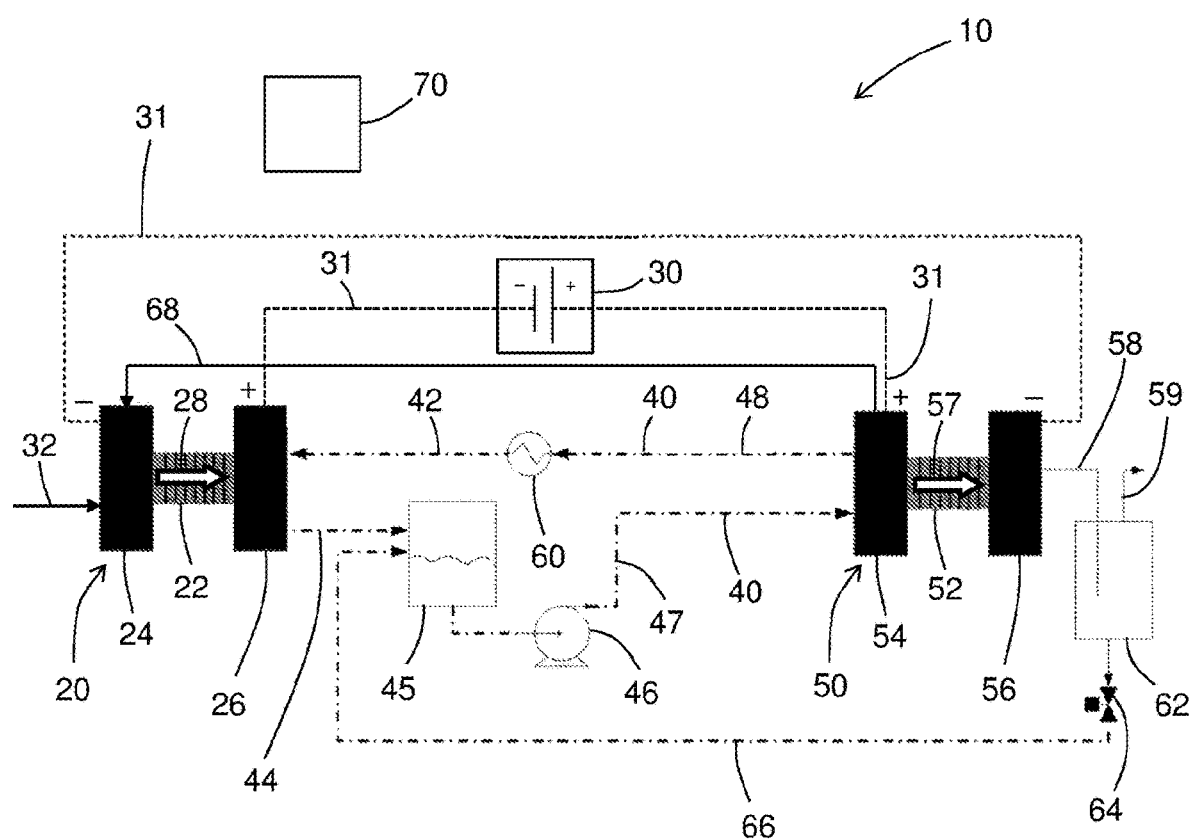

HYDROGEN SYSTEM AND METHOD OF OPERATION

This application is a National Stage Application of Patent Application PCT/US2017/013823 filed on Jan. 17, 2017, which claims the benefit of and priority to U.S. Application No. 62/279,322 filed Jan. 15, 2016, the contents of which are incorporated herein by reference in their entirety.

BACKGROUND

The subject matter disclosed herein relates to an electrochemical system for providing hydrogen.

Electrochemical hydrogen compression systems can compress hydrogen by electro-oxidizing it and subsequently electro-reducing the resulting protons in a high pressure chamber. In addition to compression of pure hydrogen, the process has been successfully demonstrated for removal of hydrogen from a mixture of hydrogen and helium, thus purifying the helium, as well as removal of hydrogen from other gas mixtures.

The throughput rate of hydrogen in an electrochemical separator stack or compressor is proportional to the electrical current at which the cell is run. The electrical current per unit active area is referred to as current density. Cell configurations with lower effective electrical resistance can be operated at higher current densities and are thus more efficient and cost effective. The bulk of the effective electrical resistance is contributed by the Ohmic resistance of the proton conducting membranes in the cells. The proton conductivity of this material is strongly influenced by its water content. Fully hydrated membranes are dramatically more conductive to protons than dry membranes.

In low pressure electrochemical purification cell stacks, there are highly effective means of maintaining the hydration of the membranes. This has been achieved by circulating liquid water on the product side of the cells. This imparts a two phase flow out of the cathode of the stack. This water/hydrogen mixture is sent to a phase separator stack and the liquid is cycled back to the cathode inlet. This circulating water loop may also be used for cooling purposes. This method is used in cells that operate with a hydrogen product pressure of up to around 200 psi.

It is not generally practical to use the same method of membrane hydration and system cooling in high product pressure configurations for a variety of reasons. It is not generally cost effective to include a pump with a suction side pressure rating high enough to circulate water that is pressurized to the system product pressure. Additionally, refilling the water chamber is a further system complication. Most critically, the water rapidly permeates from the cathode to the anode and floods the porous catalyst material and/or the generally hydrophilic material that supports the membrane. This flooding causes a loss of gas permeability and makes the stack effectively inoperable under certain conditions. As a consequence, under many circumstances, high pressure stacks must be operated with only gas humidification of their membranes, and are thus far more limited in current density than low pressure stacks.

BRIEF DESCRIPTION

According to some embodiments, a system for providing hydrogen comprises a first electrochemical cell stack comprising a first cathode and a first anode separated by a first proton exchange membrane. Also included is a first inlet is in communication with the anode side of the first electrochemical cell stack. The first inlet receives a first gas comprising hydrogen. The system also includes a liquid composition on a liquid flow path in communication with the cathode side of the first electrochemical cell stack. The liquid composition comprises water and a water-compatible redox compound. A second electrochemical cell stack comprising a second cathode and a second anode separated by a second proton exchange membrane is disposed with the anode side of the second electrochemical cell stack in communication with the liquid flow path. A hydrogen outlet in communication with the cathode side of the second electrochemical cell stack dispenses hydrogen from the system.

According to some embodiments, a method of providing hydrogen comprises feeding a gas comprising hydrogen to an anode side of a first electrochemical cell stack, feeding a liquid comprising water and a water-compatible redox compound in an oxidant form. A voltage is applied to the first electrochemical cell stack to ionize hydrogen ions at the anode side and transport them to the cathode side of the first electrochemical cell stack. The applied voltage also reduces the water-compatible redox compound to a reductant form comprising hydrogen acquired at the cathode side of the first electrochemical cell stack. The liquid comprising water and the water-compatible redox compound in reductant form is transported to an anode side of a second electrochemical cell stack, where a voltage applied to the second electrochemical cell stack oxidizes the water-compatible redox compound to the oxidant form and releases hydrogen. The released hydrogen is ionized and transported through a proton exchange membrane to form hydrogen on a cathode side of the second electrochemical cell stack from which it can be dispensed.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The FIGURE is a schematic illustration of a system for providing hydrogen in accordance with an exemplary embodiment of the invention.

DETAILED DESCRIPTION

Referring now to the FIGURE, an exemplary system 10 for providing hydrogen is shown. As shown in the FIGURE, a first electrochemical cell stack 20 comprises a separator stack 22, an anode side 24, and a cathode side 26. The separator stack comprises a plurality of individual electrochemical cells individually comprising a proton exchange membrane with an anode and a cathode disposed on opposite surfaces of the membrane. The cells can be arranged as modules in a stack, separated by interconnects that can provide flow field structures for fluid flow on each side of the membrane as well as electrical connection between the cells to provide electrical current flow in the stack. Typically, the cells in a PEM electrolyzer stack are connected in series electrically, with fluid flow distributed into or collected from the stack by header passages that are in fluid communication with the stack inlets and outlets. It should be appreciated that each of the electrochemical cells or stacks can include further components as is known in the art. These additional components can include, for example, gas diffusion layers, current collectors and the like.

Accordingly, the separator stack 22 can represent a plurality of proton exchange membranes arranged in a modular stack configuration, with interspaced interconnect/separator plates that separate the cathode-side and anode-side flow paths of adjacent cells, with the electrodes of the cells connected in series through the interconnect/separator plates. The anode side 24 of the electrochemical cell stack 20 can represent anode-side electrical connections to the cell stack (e.g., an anode bus), and an anode-side manifold that collects gas from and distributes gas to the anode side of the cell stack. The cathode side 26 of the electrochemical cell stack 20 can represent cathode-side electrical connections to the cell stack (e.g., a cathode bus), and a cathode-side manifold that collects gas from and distributes gas to the cathode side of the cell stack. Flow field structures (not shown) can be disposed on either side of the proton exchange membrane(s) in the electrochemical cell stack 20. These structures are typically disposed distal from the respective membrane(s), with the membrane(s) and the flow field structures each mounted in a frame assembly (not shown), to provide space for fluid flow in contact with the membrane.

A power manager 30 capable of operating as a power source or a load can be directly or indirectly electrically connected through electrical circuits 31 to the electrical connections of the anode side 24 and the cathode side 26. During operation, a gas 32 comprising hydrogen is fed to the anode side 24, and the first cell stack 20 operates in a fuel cell mode to deliver power to the power manager 30. Hydrogen is ionized at the anode to be converted to hydrogen ions (protons), which are separated from any other components of the gas 32 by transportation through the proton exchange membrane(s) to the cathode side 26 as represented by arrow 28.

On the cathode side 26, a liquid composition is received from a liquid flow path 40 through conduit 42. As mentioned above, the liquid composition comprises water and a water-compatible redox compound. As used herein, the term "water-compatible redox compound" means a compound that is electrochemically reversibly transformable between two water-compatible forms through a redox reaction: a reductant form and an oxidant form. By "water-compatible", it is meant that each of the reductant and oxidant forms of the redox compound is either soluble in water or can form a flowable fluid dispersion with water. In the reductant form, the water-stable redox compound incorporates extra hydrogen, and releases hydrogen when the reductant form is oxidized and converted to its oxidant form. Hydrogen is again incorporated when the oxidant form is reduced and converted to the reductant form. Examples of water-compatible redox compounds include but are not limited to enone compounds, organic enal compounds, or the formaldehyde/methanol redox couple. In some embodiments, enone compounds, also known as α,β-unsaturated carbonyl compounds, can be characterized by formula couple linked by a reversible conjugate reduction at the carbonyl according to the formula:

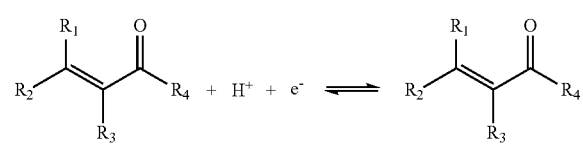

where $R_1$, $R_2$, $R_3$, and $R_4$ each represent hydrogen, an organic radical or can combine to form cyclic organic groups, or other substituents (e.g., halogen). Organic enal compounds can be characterized by the same formula with $R_4$ being hydrogen. Examples of enone compounds include methyl vinyl ketone, cyclohex-2-en-1-one, 2-methyl-2-cyclopenten-1-one, and various quinone compounds.

Quinones are compounds having a fully conjugated cyclic dione structure, such as that of benzoquinones, derived from aromatic compounds by conversion of an even number of number of —CH= groups into —C(=O)— groups with any necessary rearrangement of double bonds (polycyclic and heterocyclic analogues are included). Examples of quinones include 1,2-benzoquinone, 1,4-benzoquinone, 1,4-naphthaquinone, 9,10-anthraquinone, including substituted quinones such as anthraquinone sulfonic acid, Lawsone (2-hydroxy-1,4-naphthoquinone), and numerous other known substituted and unsubstituted quinone compounds. The hydroquinone analogs of the above-exemplified quinones are included in this disclosure through the above disclosure of example base quinone compounds. In some embodiments, quinone compounds can be characterized by formula couple linked by a reversible conjugate reduction at the carbonyl according to the formula:

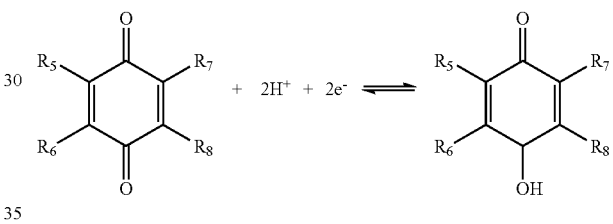

where $R_5$, $R_6$, $R_7$, and $R_8$ each represent hydrogen, an organic radical such as alkyl or can combine to form cyclic organic groups, or other substituents such as halogen.

Some representative examples of standard electrode potentials ($E^0$) for selected water-compatible redox compound couples are set forth in the Table below:

| Oxidant | Reductant | $E^0$ (Volts) |
|---|---|---|
| 1,4-benzoquinone + $2H^+$ + $2e^-$ | 1,4-hydroquinone | +0.6992 |
| $H_2C=O$ + $2H^+$ + $2e^-$ | $CH_3OH$ | +0.13 |

The relative amounts of water and the water-compatible redox compound in the liquid composition depends on various factors such as the solubility of the water-compatible redox compound, and the skilled person can readily determine an appropriate water content in the liquid flow path for particular specified materials and performance conditions through reasonable experimentation. In some embodiments, the redox compound can be fully soluble in water or is included in an amount up to its solubility limit, providing an aqueous solution comprising water and the redox compound. In some embodiments, the redox compound can be included in an amount exceeding its solubility in water, providing a dispersion of an aqueous phase and a non-aqueous phase, wherein the redox compound can be present in each phase. In some embodiments, the redox compound is present in a solution with water at its maximum solubility limit in water. In some embodiments where the liquid composition comprises an aqueous solution of the redox compound or comprises an aqueous phase comprising the redox compound, the molar concentration of redox compound in the aqueous phase or solution can be in a range having a lower endpoint of 0.1 M, 0.2 M, 0.3 M, 0.5 M, 0.7 M, or 1 M, and an upper endpoint of 3 M, 4 M, 5 M, 7 M, or 10 M. All possible combinations of the above-mentioned range endpoints (excluding impossible combinations where a low endpoint would have a greater value than a high endpoint) are explicitly included herein as disclosed ranges. In some embodiments, acid can be present to enhance the electrical conductivity of the solution. In some embodiments, the molar concentration of acid in the aqueous phase or solution can be in a range having a lower endpoint of 0 M, >0 M, 0.5 M, or 1 M, and an upper endpoint of 3 M, 4 M, 5 M, or 6 M. All possible combinations of the above-mentioned range endpoints (excluding impossible combinations where a low endpoint would have a greater value than a high endpoint) are explicitly included herein as disclosed ranges. In some embodiments, the acid comprises $H_2SO_4$.

With reference again to the FIGURE, the liquid composition comprising water and a water-compatible redox compound exits from the cathode side 26 of the first electrochemical cell stack 20 through conduit 44 to continue on the liquid flow path 40. As shown in the FIGURE, the liquid flows into optional storage tank 45 from where it is pumped by pump 46 through conduit 47 to a second electrochemical cell stack 50. The second electrochemical cell stack 50, similar to the first electrochemical cell stack 20, includes a separator stack 52, an anode side 54, and a cathode side 56. During operation, the power manager 30 applies a voltage through the electrical circuits 31 to the cathode and anode sides 54/56. The liquid containing water and a reductant form of the water-compatible redox compound enters the anode side 54 from the liquid flow path conduit 44, where it is oxidized at the charged anode to convert it to the oxidant form and release hydrogen, which is transported as hydrogen ions through the proton exchange membrane(s) to the cathode side 56, as represented by arrow 57. Hydrogen ions are neutralized at the charged cathode 56, and form hydrogen gas at the cathode side 56, which is dispensed from the system through conduits 58 and 59. The liquid composition comprising water and the water-compatible redox compound now in oxidant form exits the cathode side 56 through conduit 48, from which it flows to optional heat exchanger 60 where it is cooled and then directed through the conduit 42 back to the cathode side 26 of the first electrochemical cell stack 20 to complete the loop of the liquid flow path 40. Some liquid may accumulate on the cathode side 56 of the second electrochemical cell stack 50, and this liquid can be collected in a liquid recovery tank 62 and returned through pressure control valve 64 and conduit 66 to the liquid storage tank 45 for re-circulation in the liquid flow path 40. Also, in the absence of a catalyst that is active to hydrogen gas on the anode of the high pressure stack, some hydrogen bubbles may form in the liquid. This gas can be separated and returned to the anode side 26 of the first electrochemical cell stack 20 through conduit 68. The power supply 30 is connected to the anode and cathode sides of the first and second electrochemical cell stacks 20/50 through electrical connections 34 and provides a voltage to the first and second electrochemical cell stacks 20/50 during operation.

The system also includes a controller 70 in communication (e.g., via an electronic signal) with the first and second electrochemical cells 20/50, specifically in communication with the power supply 30, and with other process control components such as pump 46, heat exchanger 59, pressure control valve 64, and various other components such as control valves such as controlling flow of the feed gas 32 and other process control equipment.

The proton exchange membranes used in the electrochemical cell stacks 20/50 can comprise electrolytes that are solids under the operating conditions of the electrochemical cell. Useful materials from which the membranes can be fabricated include proton conducting ionomers and ion exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION® resins (commercially available from E. I. du Pont de Nemours and Company, Wilmington, Del.).

The anodes for the anode sides 24/54 and cathode sides 26/56 can be fabricated from catalytic materials suitable for performing the needed electrochemical reaction (e.g., the dissociation of hydrogen gas). Suitable catalytic materials include, but are not limited to, platinum, palladium, rhodium, carbon, gold, tantalum, tungsten, ruthenium, iridium, osmium, alloys thereof, and the like, as well as combinations of the foregoing materials. The anodes and cathodes can be positioned adjacent to, and preferably in contact with, their respective proton exchange membrane and can include structures comprising discrete catalytic particles adsorbed onto a porous substrate. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of proton exchange membranes or onto support members.

In some embodiments, the system can be used to compress hydrogen provided at a relatively low pressure in the feed gas 32 to a relatively high pressure. In some embodiments, the first electrochemical cell stack 20 can operate at a pressure of less than 500 psi, more specifically less than 200 psi. In some embodiments, the first electrochemical cell stack 20 can operate at a pressure of 200-500 psi. In some embodiments, the second electrochemical cell stack 50 can dispense hydrogen in the conduits 58 and 59 at pressures of 200 psi to 10,000 psi. In some embodiments, the second electrochemical cell stack 50 can dispense hydrogen in the conduits 58 and 59 at pressures of 500 psi to 10,000 psi. In some embodiments, the second electrochemical cell stack 50 can dispense hydrogen in the conduits 58 and 59 at pressures of 1000 psi to 10,000 psi. Additional electrochemical cell stacks can also be disposed in series between the first and second electrochemical cell stacks with liquid flow for redox liquids between the respective electrochemical stacks. The water content in the circulating liquid keeps both stacks hydrated, and the relative incompressibility of the liquid on the liquid flow path 40 and on the anode side 54 of the second electrochemical cell stack 50 can promote a technical effect of avoiding the flooding problems that can occur when trying to hydrate with water flow on the cathode side 56 of the second (high pressure) electrochemical cell stack 50.

Other technical effects can be achieved in various embodiments. Although two stacks or more stacks are utilized in this configuration instead of one, both stacks can be operated efficiently at much higher current densities, thus reducing the cost of the overall system. The first electrochemical cell stack 20 can be a relatively low cost, low differential pressure stack. The kinetics of the electro-chemical reactions of some redox compounds such as quinones can be rapid on carbon electrodes, so the electrodes of the first electrochemical cell stack can avoid the need for precious metal or even metal catalyst materials. The effect of membrane hydration with liquid as opposed to gas can be quite significant. A typical low pressure configuration in which water is circulated on the cathode is capable of a current density of at least 1.5 A/cm$^2$. In contract, high pressure cells humidified by vapor can only be practically operated to around 0.25 A/cm$^2$.

Of course, as mentioned above, the system depicted in the FIGURE is exemplary, and systems according to the invention can include various other components. For example, multiple first stacks can be disposed in parallel and/or multiple second stacks can be disposed in parallel to provide additional capacity. Multiple first stacks can be disposed in series and/or multiple second stacks can be disposed in series to provide greater hydrogen pressure outputs and/or purity. Other modifications and/or additions within the skill of the art can be made as well. Also, although the FIGURE shows a single power manager 30 harvesting electrical power from the first electrochemical cell stack 20 and delivering electrical power to the second electrochemical cell stack 50, each of the first and second electrochemical cell stacks 20/50 can be independently connected to an independent power load and source, respectively.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for providing hydrogen, comprising:
   a first electrochemical cell stack comprising a first cathode and a first anode separated by a first proton exchange membrane, a first inlet in communication with the anode side of the first electrochemical cell stack that receives a first gas comprising hydrogen;
   a liquid composition on a liquid flow path in communication with the cathode side of the first electrochemical cell stack, said liquid composition comprising water and a water-compatible redox compound;
   a second electrochemical cell stack comprising a second cathode and a second anode separated by a second proton exchange membrane with the anode side of the second electrochemical cell stack in communication with the liquid flow path, and a hydrogen outlet in communication with the cathode side of the second electrochemical cell stack.

2. The system of claim 1, wherein the water-compatible redox compound comprises an organic compound comprising an α,β-unsaturated carbonyl group.

3. The system of claim 2, wherein redox compound comprises a quinone compound.

4. The system of claim 1, wherein the second electrochemical cell stack produces hydrogen at a pressure greater than the hydrogen pressure on the anode side of the first electrochemical cell stack.

5. The system of claim 1, further comprising a heat exchanger comprising a heat rejection side in communication with the liquid flow path, and a heat absorption side in communication with a heat sink.

6. The system of claim 1, further comprising a return flow path to the liquid flow path of liquid from the cathode side of the second electrochemical cell stack.

7. The system of claim 1, further comprising a flow path for hydrogen gas from the anode side of the second electrochemical cell stack to the anode side of the first electrochemical cell stack.

8. A method for providing hydrogen, comprising:
   feeding a gas comprising hydrogen to an anode side of a first electrochemical cell stack, feeding a liquid comprising water and a water-compatible redox compound in an oxidant form;
   applying a voltage to the first electrochemical cell stack to ionize hydrogen ions at the anode side and transport them to the cathode side of the first electrochemical cell stack, and to reduce the water-compatible redox compound to a reductant form comprising hydrogen acquired at the cathode side of the first electrochemical cell stack;
   transporting the liquid comprising water and the water-compatible redox compound in reductant form to an anode side of a second electrochemical cell stack;
   applying a voltage to the second electrochemical cell stack to oxidize the water-compatible redox compound to the oxidant form and release hydrogen, and to transport ions of the released hydrogen through a proton exchange membrane to form hydrogen on a cathode side of the second electrochemical cell stack; and
   providing hydrogen from the cathode side of the second electrochemical cell stack.

9. The method of claim 8, wherein the water-compatible redox compound comprises an organic compound comprising an α,β-unsaturated carbonyl group.

10. The method of claim 9, wherein redox compound comprises a quinone compound.

11. The method of claim 8, wherein the second electrochemical cell stack produces hydrogen at a pressure greater than the hydrogen pressure on the anode side of the first electrochemical cell stack-.

12. The method of claim 8, further comprising cooling the liquid on the liquid flow path with a heat exchanger comprising a heat rejection side in communication with the liquid flow path, and a heat absorption side in communication with a heat sink.

13. The method of claim 8, further comprising returning liquid from the cathode side of the second electrochemical cell stack to the liquid flow path.

14. The method of claim 8, further comprising returning hydrogen gas from the anode side of the second electrochemical cell stack to the anode side of the first electrochemical cell stack.

* * * * *